(12) United States Patent
Bamba

(10) Patent No.: US 7,187,693 B2
(45) Date of Patent: Mar. 6, 2007

(54) COMMUNICATION APPARATUS AND METHOD FOR SETTING LINE CAPACITY THEREOF

(75) Inventor: Masakazu Bamba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 732 days.

(21) Appl. No.: 09/957,154

(22) Filed: Sep. 20, 2001

(65) Prior Publication Data
US 2002/0181493 A1    Dec. 5, 2002

(30) Foreign Application Priority Data
Jun. 4, 2001 (JP) .............................. 2001-167784

(51) Int. Cl.
  *H04J 3/16* (2006.01)
  *H04J 3/22* (2006.01)
(52) U.S. Cl. ...................... 370/468; 370/400; 370/539; 370/230; 709/249; 709/223
(58) Field of Classification Search ................ 370/468, 370/222, 223, 229, 230, 230.1, 231, 232, 370/235, 237, 252, 338, 389, 400, 395.21, 370/395.41, 401, 424, 466, 469, 470, 473; 709/230, 249, 223, 224, 231, 236, 238, 251
See application file for complete search history.

(56) References Cited

U.S. PATENT DOCUMENTS

| | | | | | |
|---|---|---|---|---|---|
| 5,506,834 | A | * | 4/1996 | Sekihata et al. | 370/253 |
| 5,583,860 | A | * | 12/1996 | Iwakawa et al. | 370/232 |
| 5,588,003 | A | * | 12/1996 | Ohba et al. | 370/468 |
| 6,122,281 | A | * | 9/2000 | Donovan et al. | 370/401 |
| 6,587,470 | B1 | * | 7/2003 | Elliot et al. | 370/404 |
| 6,636,529 | B1 | * | 10/2003 | Goodman et al. | 370/469 |
| 6,658,457 | B2 | * | 12/2003 | Nishikawa et al. | 709/206 |
| 6,738,825 | B1 | * | 5/2004 | Bortolotto et al. | 709/238 |
| 6,754,189 | B1 | * | 6/2004 | Cloutier et al. | 370/329 |
| 6,865,181 | B1 | * | 3/2005 | Elliot et al. | 370/364 |
| 2001/0029546 | A1 | * | 10/2001 | Motoyama | 709/235 |
| 2001/0033570 | A1 | * | 10/2001 | Makam et al. | 370/373 |
| 2002/0181499 | A1 | * | 12/2002 | Kfir et al. | 370/466 |

* cited by examiner

*Primary Examiner*—Chirag G. Shah
(74) *Attorney, Agent, or Firm*—Katten Muchin Roseman LLP

(57) ABSTRACT

A communication apparatus that, in sending and receiving data between a LAN and a certain network, dynamically sets the capacity of a line used for sending and receiving data via the network based on the amount of use of a line used for sending and receiving data via the LAN, and a method for setting the line capacity thereof are disclosed.

4 Claims, 11 Drawing Sheets

COMMUNICATION APPARATUS AND METHOD FOR SETTING LINE CAPACITY THEREOF

BACKGROUND OF THE INVENTION

This invention relates to a communication apparatus for sending and receiving data between a LAN (Local Area Network) and a network such as a SONET (synchronous optical network) network or a SDH (synchronous digital hierarchy) network, and to a method for setting the line capacity thereof.

SONET and SDH are known as typical synchronous communication systems. These are standard frame formats for effective transfer of various kinds of information with speeds varying from low speed to high speed. These have been standardized by ITU-T (International Telecommunication Union —Telecommunication Standardization Sector) and are now used worldwide mainly in backbone networks. SONET and SDH are not "synchronous communication systems" in the strict sense, since they generate misalignment of 1 byte per frame at the maximum. However, these systems will be regarded as "synchronous" in the description herein including the case where such misalignment occurs. Further, since SDH and SONET are essentially the same in their characteristics such as the frame structures and the multiplexing schemes, the following description will be focused on SONET.

Conventionally, a technique for interconnecting LANs via this SONET is known. This technique is referred to as Packet Over SONET and enables connection between IP (Internet Protocol) networks constituting LANs and a SONET network. Such connection is made by communication apparatus connected to both networks.

FIGS. 12 and 13 are schematic block diagrams of conventional communication apparatus for connecting IP networks and one or more SONET networks. FIG. 12 shows a configuration of a communication apparatus having one LAN interface, and FIG. 13 shows a configuration of a communication apparatus having a plurality of LAN interfaces.

These communication apparatus have one or more LAN interfaces as low speed interfaces connected to the IP networks and one or more SONET interfaces as high speed interfaces to which one or more SONET networks are connected. For example, in these communication apparatus, data (packets) sent from a LAN is processed within one of the LAN interfaces in a closed manner as long as the LAN interface can process the data. If the data cannot be processed within the LAN interfaces, it is sent to one of the SONET interfaces. The SONET interface converts the packets sent from the LAN interface into SONET frames and sends them to the SONET network.

Here, the communication apparatus shown in FIG. 12 has only one SONET interface for the LAN interface, and therefore it will send all packets to the SONET interface if it cannot route packets only by the LAN interface. That is, packets that cannot be routed by the LAN interface are all sent to the SONET interface, and an administrator of the apparatus has no way to change this configuration. While this method imposes little burden of operation and management for connecting the LAN interface and the SONET interface, it involves a problem that effectiveness of network use decreases unless SONET is appropriately set. When IP packets are converted into SONET frames, various formats according to the SONET standards are used, such as STS1, STS3C, and STS12C. For example, the amount of IP packets to be input to the communication apparatus is estimated to determine the capacity of SONET frames into which IP packets are to be converted. However, this correspondence needs to be preset and cannot be changed by the communication apparatus itself. Therefore, without appropriate setting of the capacity of SONET frames, IP packets that are input from the LAN cannot be efficiently sent to the SONET network; discarded IP packets increases and empty portions appear in SONET frames.

As to the communication apparatus shown in FIG. 13, it has a plurality of SONET interfaces for a plurality of LAN interfaces, and therefore it sends packets that cannot be routed by the LAN interfaces to an appropriate SONET interface. Here, the LAN interfaces and the SONET interfaces perform routing based on information available for an administrator of the apparatus in advance. Thus, appropriate packets are sent to an appropriate SONET interface from a LAN interfaces. With this method, selecting an appropriate SONET interface enables efficient use of the network if the network is stably operated, but the network configuration cannot be changed once it has been set. For example, it is difficult to make changes such as changing a data line into a line for graphic data or adding another data line. Such changes may be addressed by setting SONET frames in consideration of the maximum size of packets to be sent and received, and reserving redundant transmission capacity. However, generally it is rare that packets having a fixed volume are constantly sent and received, but the actual transmission volume of packets sent and received dynamically changes depending on the kinds and contents of data. This poses problems that empty portions appear in SONET frames and the efficiency of network use decreases.

SUMMARY OF THE INVENTION

This invention has been made in consideration of these issues, and the object of this invention is to provide a communication apparatus capable of increasing efficiency of network use and a method for setting the line capacity thereof.

In sending and receiving data between a LAN and a certain network, the communication apparatus according to this invention dynamically sets the capacity of a line used for sending and receiving data via the network based on the amount of use of a line used for sending and receiving data via the LAN. Because the capacity of the line for the network is dynamically set, a large capacity is set for a large amount of data incoming via the LAN; in contrast, a small capacity is set for a small amount of data incoming via the LAN. This can eliminate the need for setting an unnecessarily large line capacity and can reduce the idle capacity of the line, thereby increasing efficiency of network use.

It is preferable that the communication apparatus comprises a first interface device for sending and receiving data to/from the above-mentioned LAN, and a second interface device for sending and receiving data to/from the network. With the interface devices corresponding to the LAN and the certain network respectively, the communication apparatus can readily accommodate the respective lines.

It is also preferable that the communication apparatus comprises a line connection device for connecting the lines between the above-mentioned LAN and the network. This enables line connection between the LAN and the certain network, thereby enabling data transmission by the communication apparatus.

It is also preferable that the communication apparatus comprises a monitoring device for monitoring operations of the above-mentioned first and second interface devices to set the capacity of the line used for sending and receiving data via the network based on the amount of use of the line used for sending and receiving data via the LAN. By monitoring operations of the first and second interface devices, it is possible to easily determine the amount of use of the line incoming via the LAN, or to check for the idle capacity of the line extending via the certain network for increasing the capacity of the line.

It is also preferable that the first interface device has a buffer for temporarily storing data to be sent to the LAN and data received from the LAN, and that the above-mentioned monitoring device sets the capacity of the line used for sending and receiving data via the network based on the amount of use of the buffer. The amount of use of the line incoming via the LAN can be readily known by checking the amount of use of this buffer.

It is also preferable that the above-mentioned network is a SONET/SDH network, and that a mapping scheme for SONET/SDH frames is dynamically set. By having the mapping scheme for SONET/SDH frames variable, the capacity of the line for sending and receiving data by using such frames can be readily changed.

It is also preferable that, when the above-mentioned mapping scheme for SONET/SDH frames has been dynamically changed, a receiver apparatus is informed of the change of the mapping scheme by overheads of the SONET/SDH frames. Since H1 byte and other bytes included in the overhead have been conventionally used to indicate a mapping scheme, SONET/SDH frames can be used without any modification.

It is also preferable that the above-mentioned first interface device has conversion unit for converting a data format for sending and receiving via the LAN into a data format for sending and receiving via the network. Because data is converted into the format for the certain network in the first interface device accommodating the LAN, various kinds of processing in the communication apparatus can be performed in a consistent manner with the data format used for the certain network. Thus, processing can be made simple, and processed data can be unified.

It is also preferable that the communication apparatus comprises the above mentioned first and second interface devices, line connection device, and monitoring device, and that the communication apparatus is configured with the monitoring device and any combination of other devices. Thus, the communication apparatus can be adapted for various network configurations.

In sending and receiving data between the LAN and the certain network, the communication apparatus according to this invention dynamically sets the line capacity accordingly when it detects that change is made to the capacity of the line used for sending and receiving data via the network. Thus, a receiver communication apparatus for the data can dynamically change the line capacity.

It is also preferable that the above-mentioned network is a SONET/SDH network, and that the change of the line capacity is detected based on contents of overheads of SONET/SDH frames. Thus, the receiver communication apparatus can also keep compatibility with conventional apparatus.

In sending and receiving data between the LAN and the certain network, the method for setting the line capacity in the communication apparatus according to this invention involves dynamically setting the capacity of the line used for sending and receiving data via the network based on the amount of use of the line used for sending and receiving data via the LAN. Setting the line capacity in this way can eliminate the need for setting an unnecessarily large line capacity and can reduce the idle capacity of the line. Thus, efficiency of network use can be increased.

DESCRIPTION OF THE PREFERRED EMBODIMENT

A network of an embodiment to which this invention is applied is described below with reference to the drawings.

Figure 1:
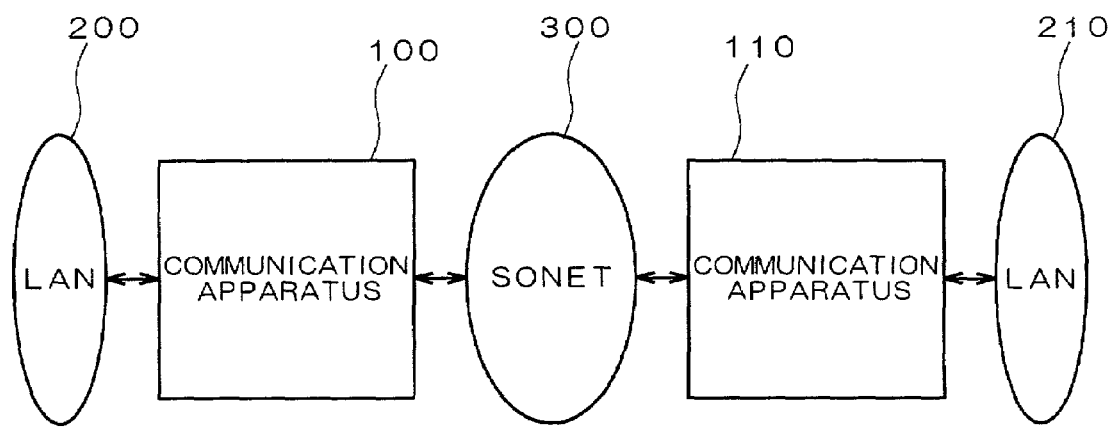
FIG. 1 is a diagram showing an overall configuration of a network in an embodiment.

FIG. 1 shows an overall configuration of the network of this embodiment to which this invention is applied. As shown in FIG. 1, in the network of this embodiment, a LAN 200 and a LAN 210 are connected over a SONET network 300. Further, a communication apparatus 100 is connected between the LAN 200 and the SONET network 300, and a communication apparatus 110 is connected between the LAN 210 and the SONET network 300. Connecting the LAN 200 and the LAN 210 over the SONET network 300 with the intermediate communication apparatus 100 and 110 in this manner enables IP packets to be sent and received between the LAN 200 and the LAN 210.

Figure 2:
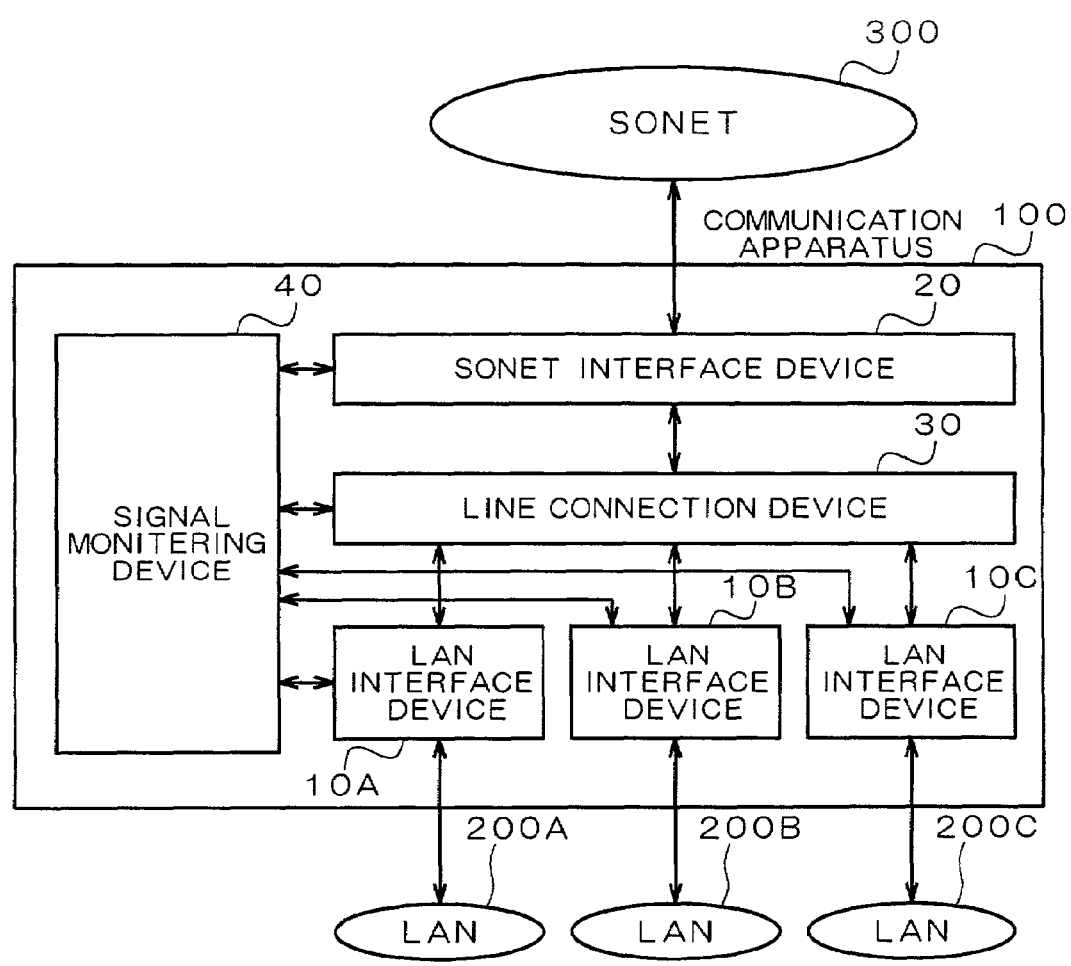
FIG. 2 is a block diagram showing a configuration of communication apparatus.

FIG. 2 is a block diagram of the communication apparatus 100. The other communication apparatus 110 also has the same configuration as that of the communication apparatus 100.

As shown in FIG. 2, the communication apparatus 100 comprises a plurality of LAN interface devices 10A, 10B, and 10C, a SONET interface device 20, a line connection device 30, and a signal monitoring device 40.

The LAN interface devices 10A, 10B, and 10C are connected with the generalized LAN 200 including a VPN and so on via predetermined lines. In FIG. 2, the LAN 200 consists of a LAN 200A, 200B, and 200C. The LAN 200A is connected to the LAN interface device 10A, the LAN 200B is connected to the LAN interface device 10B, and the LAN 200C is connected to the LAN interface device 10C, respectively.

Each of the LAN interface devices 10A, 10B, and 10C sends and receives IP packets to/from the LAN such as the LAN 200A connected to it and has a function of converting IP packets into SONET frames and SONET frames into IP packets. In this way, the LAN interface devices 10A, 10B, and 10C include an internal mechanism for converting IP packets into SONET frames, and they output SONET frames instead of IP packets unlike conventional LAN interface devices.

The SONET interface device 20 is connected to the SONET network 300 to send and receive SONET frames to/from the SONET network 300.

The line connection device 30 acts as a cross-connect device to interconnect the LAN interface devices 10A, 10B, and 10C and the SONET interface device 20. This cross-connect device performs routing by switching the connection state within itself so that SONET frames sent from the LAN interface devices 10A and so on are sent back to the LAN interface devices 10A and so on or sent to the SONET network 300 via the SONET interface device 20.

The line connection device 30 has a plurality of I/O ports, each connected to one of the LAN interface devices 10A, 10B, and 10C, or to the SONET interface device 20. The signal monitoring device 40 specifies the connection state of each I/O port.

The signal monitoring device 40 controls routing by specifying the connection state of each I/O port of the line connection device 30 so that SONET frames that are output from the LAN interface devices 10A, 10B, 10C, or the SONET interface device 20 are sent to appropriate routing directions. The signal monitoring device 40 also monitors the volume of IP packets before they are read from buffers (to be described later) provided in the LAN interface devices 10A, 10B, and 10C respectively, and changes mapping to change the capacity of SONET frames as needed. This monitoring of the state within the communication apparatus 100 by the signal monitoring device 40 is performed autonomously.

"Mapping" herein refers to associating IP packets from the LAN 200 with locations in SONET frames where the IP packets are to be placed. The mapping scheme of the communication apparatus 100 at the sender of SONET frames has to be matched with the communication apparatus 110 at the receiver of the SONET frames. As a general operation of SONET, if the mapping scheme is unmatched, the communication apparatus 110 that receives SONET frames will send LOP (Loss of Pointer) to the sender communication apparatus 100 to indicate failure. In this invention, if the sender communication apparatus 100 has changed the mapping of SONET frames, the receiver communication apparatus 110 can know the details of the change of the mapping by checking H1, H2, H3, and H4 bytes in SONET-Overhead included in received SONET frames. If the receiver communication apparatus 110 is able to change its own mapping according to the change, the receiver communication apparatus also changes the mapping. Thus, the output of LOPs that has been continued during this change is stopped when the change is completed. If the receiver communication apparatus 110 cannot change the mapping, the output of LOPs is continued even after a predetermined period; the sender communication apparatus 100 can know that the receiver communication apparatus 110 cannot change the mapping when detecting LOPs after the predetermined period.

Figure 3:
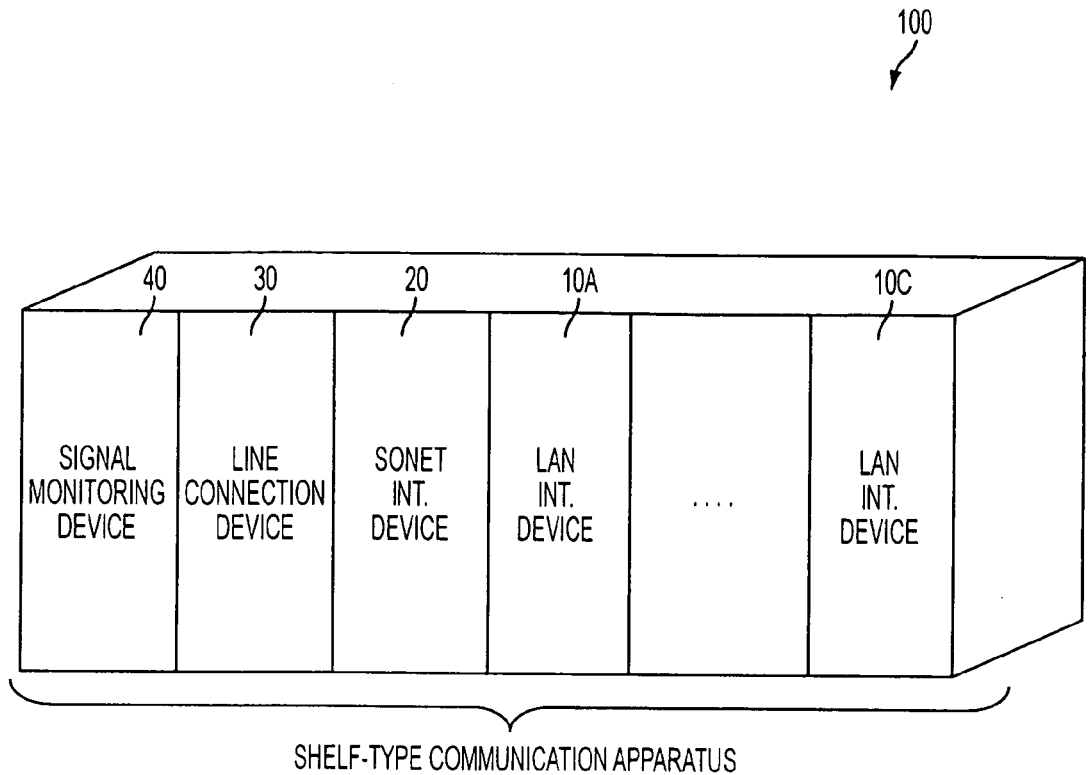
FIG. 3 is a perspective view showing an exterior of a shelf-type communication apparatus.
Figure 4:
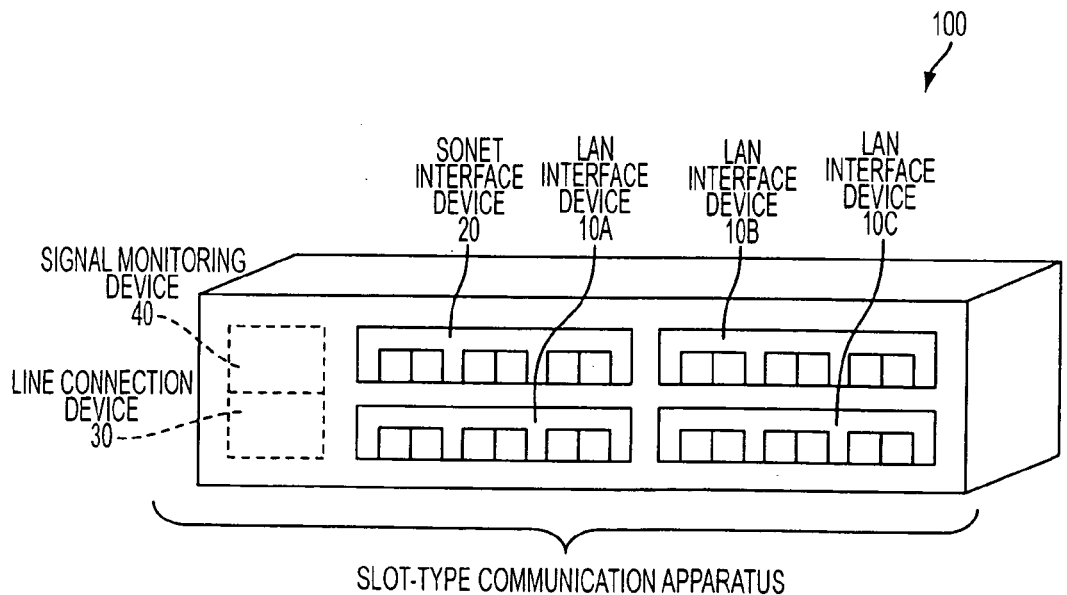
FIG. 4 is a perspective view showing an exterior of a slot-type communication apparatus.

FIG. 3 is a perspective view showing the exterior of a shelf-type communication apparatus 100. FIG. 4 is a perspective view showing the exterior of a slot-type communication apparatus 100. While the communication apparatus 100 shown in these figures are different in their exteriors and configurations of constituent devices, they have the same basic functions, and each of them has the LAN interface devices 10A, 10B, and 10C, the SONET interface device 20, the line connection device 30, and the signal monitoring device 40 in a dedicated enclosure (cabinet).

Figure 5:
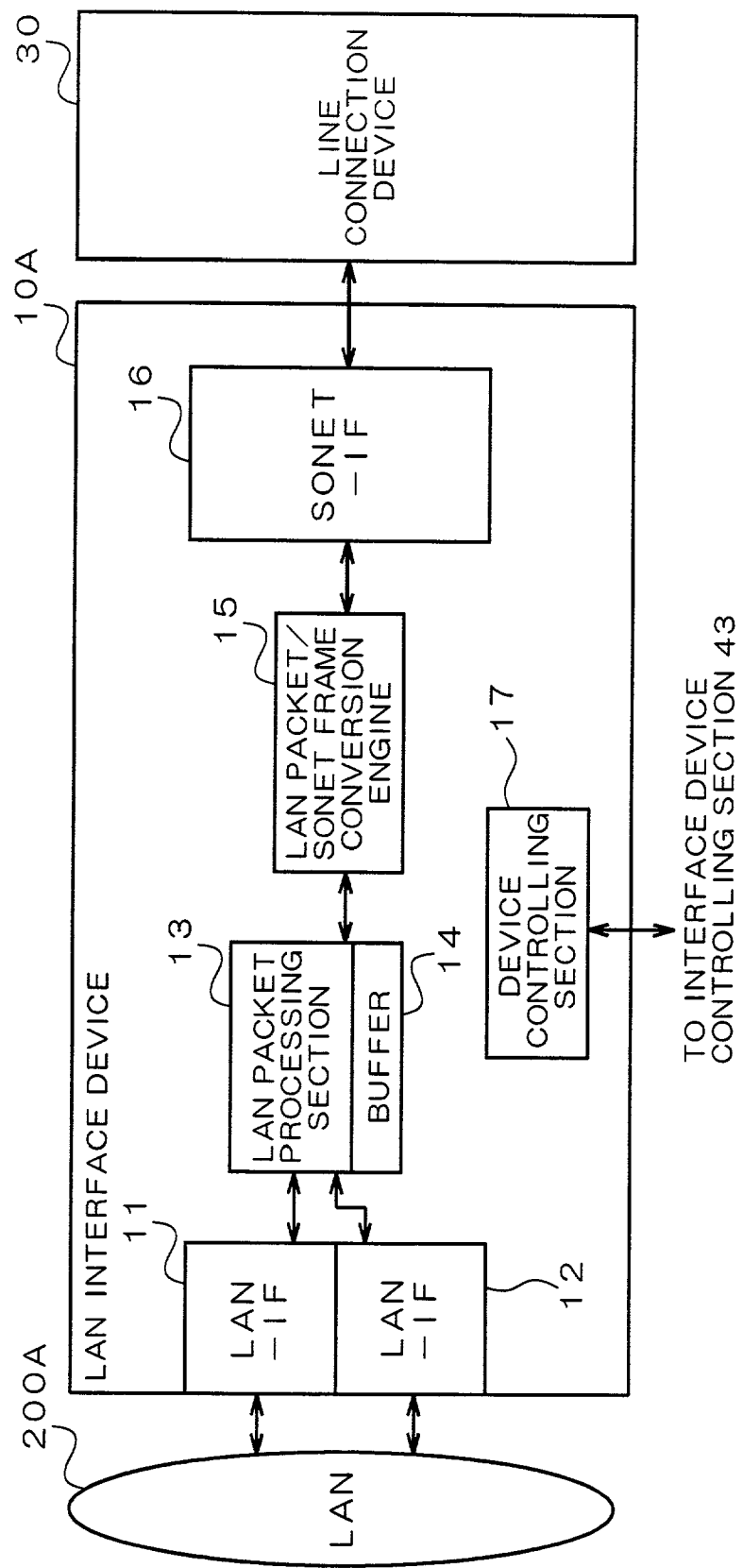
FIG. 5 is a detailed block diagram showing a configuration of a LAN interface device.

FIG. 5 is a detailed block diagram showing a configuration of the LAN interface device 10A. Other LAN interface devices 10B and 10C also have the same configuration as that of the LAN interface device 10A.

As shown in FIG. 5, the LAN interface device 10A comprises LAN interface sections (LAN-IFs) 11 and 12, a LAN packet processing section 13, a buffer 14, a LAN packet/SONET frame conversion engine 15, a SONET interface section (SONET-IF) 16, and a device controlling section 17.

Each of the LAN interface sections 11 and 12 provides input/receives output of electrical signals to/from the LAN 200A. IP packets are input and output to/from the LAN 200A through these LAN interface sections 11 and 12.

The LAN packet processing section 13 performs routing and filtering functions, like a router, in accordance with a LAN protocol while temporarily storing, in the buffer 14, IP packets that were input from the LAN interface section 11 or 12, or from the LAN packet/SONET frame conversion engine 15. The LAN protocol may be, for example, 10BASE, 100BASE, 1000BASE, and so on.

The LAN packet/SONET frame conversion engine 15 converts IP packets that were input from the LAN packet processing section 13 into SONET frames and converts SONET frames that were input from the line connection device 30 side into IP packets.

The SONET interface section 16 provides input/receives output of electrical signals to/from the line connection device 30. SONET frames are input and output between line connection device 30 and the LAN packet/SONET frame conversion engine through this SONET interface section 16.

The device controlling section 17 is connected to an interface device controlling section 43 (to be described later) in the signal monitoring device 40 to collect information on current idle capacity of the lines and so on.

Figure 6:
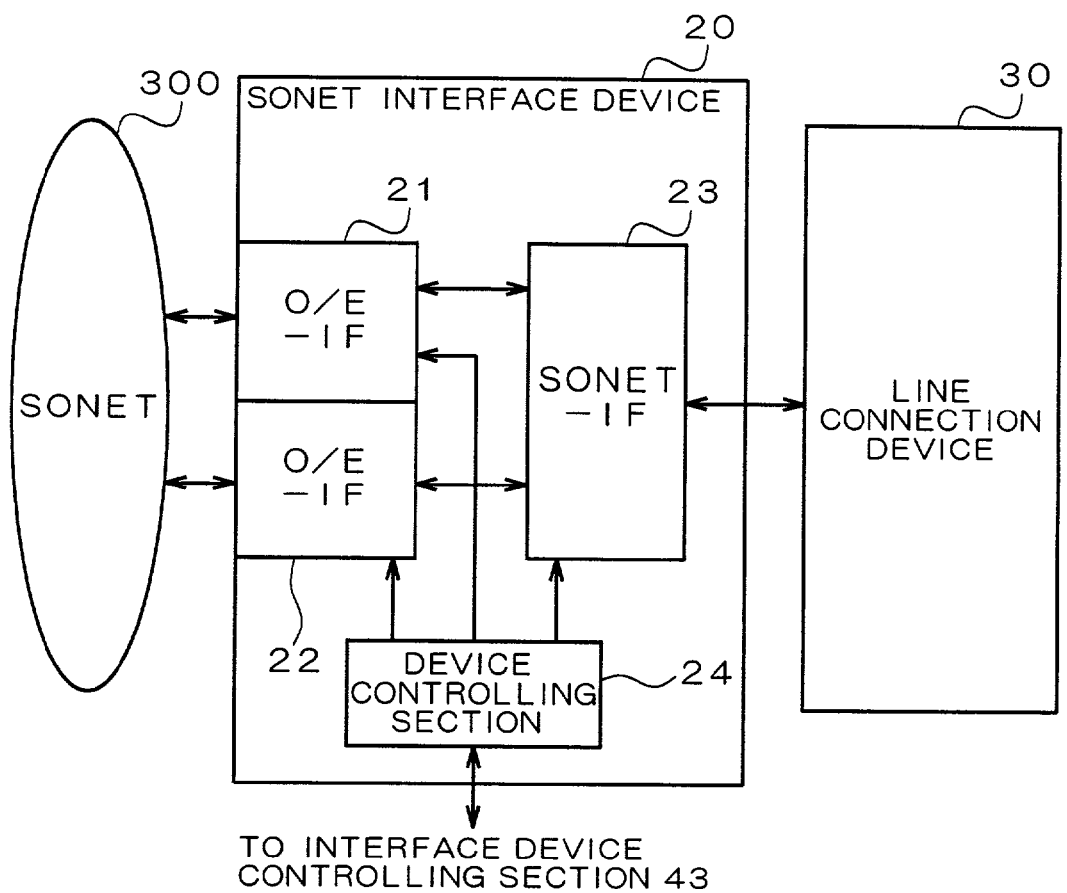
FIG. 6 is a detailed block diagram showing a configuration of a SONET interface device.

FIG. 6 is a detailed block diagram showing a configuration of the SONET interface device 20. As shown in FIG. 6, the SONET interface device 20 is responsible for controlling sending and receiving SONET frames to/from the SONET network 300 and comprises optical/electrical interface sections (O/E-IFs) 21 and 22, a SONET interface section (SONET-IF) 23, and a device controlling section 24.

Each of the optical/electrical interface sections 21 and 22 provides input/receives output of optical or electrical signals to/from the SONET network 300. If the SONET network 300 is built with transmission lines such as optical fibers, the optical/electrical interface sections 21 and 22 output optical signals to the SONET network 300, and convert optical signals that are input from the SONET network 300 into electrical signals. If the SONET network 300 is built with transmission lines such as coaxial cables, electrical signals are input and output through the optical/electrical interface sections 21 and 22. The SONET interface section 23 provides input/receives output of SONET frames to/from the line connection device 30. The device controlling section 24 controls the entire SONET interface device 20.

Figure 7:
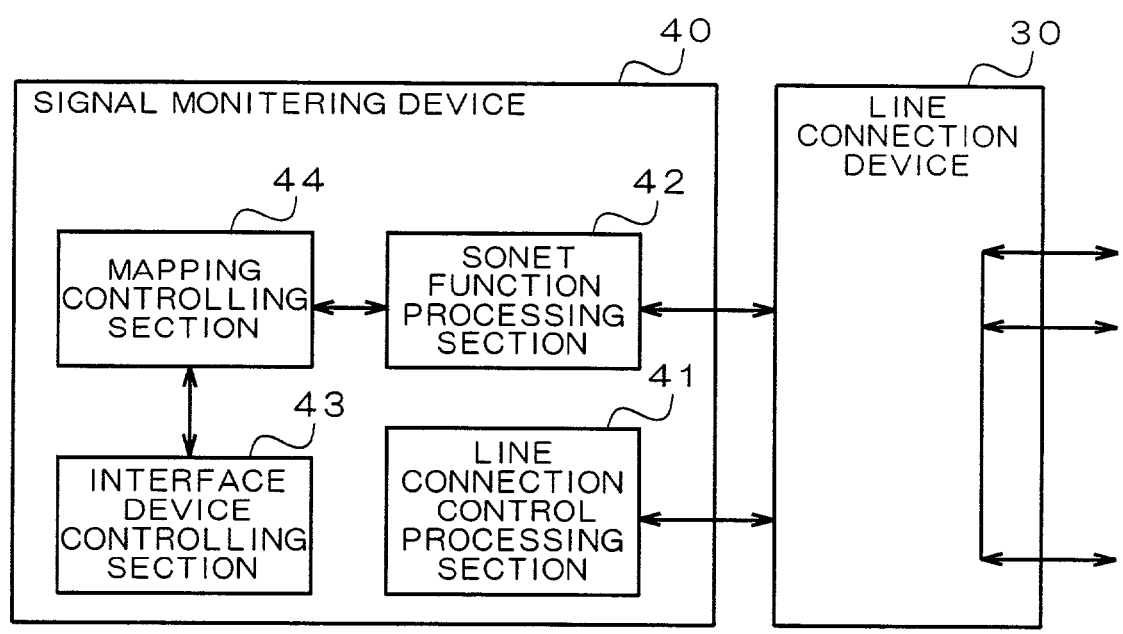
FIG. 7 is a detailed block diagram showing a configuration of a signal monitoring device.

FIG. 7 is a detailed block diagram showing a configuration of the signal monitoring device 40. As shown in FIG. 7, the signal monitoring device 40 comprises a line connection control processing section 41, a SONET function processing section 42, the interface device controlling section 43, and a mapping controlling section 44.

The line connection control processing section 41 controls the connection state of the routing direction in the line connection device 30. The SONET function processing section 42 performs general processing necessary for sending and receiving SONET frames (for example, error monitoring). The interface device controlling section 43 monitors the configuration and operation of each interface device included in the communication apparatus 100. Because the communication apparatus 100 in this embodiment comprises three LAN interface devices 10A, 10B, and 10C and one SONET interface device 20, the interface device controlling section 43 keeps track of the device configurations and monitors the idle capacity of an active device and so on. The interface device controlling section 43 also monitors the amount of use of the buffer 14 in each of the LAN interface devices 10A, 10B and 10C. The mapping controlling section 44 changes the mapping scheme for SONET frames based on the amount of use of the buffer 14. For example, if the amount of use of the buffer 14 is below a first value (for example, 20%), it changes the mapping scheme for SONET frames to reduce the current capacity of SONET frames by one level. If the amount of use of the buffer 14 is above a second value (for example, 80%), it changes the mapping scheme for SONET frames to increase the current capacity of SONET frames by one level.

Each of the above-mentioned LAN interface devices 10A, 10B, and 10C corresponds to a first interface device; the above-mentioned SONET interface device 20 corresponds to a second interface device; and the above-mentioned signal monitoring device 40 corresponds to a monitoring device.

The communication apparatus 100 in this embodiment has the foregoing configuration, and now the operation thereof is described. By way of example, the operation by which SONET frames are sent from a communication apparatus 100 to the other communication apparatus 110 is described for the sender communication apparatus 100 and for the receiver communication apparatus 110 respectively.

Operation of the Sender Communication Apparatus

Figure 8:
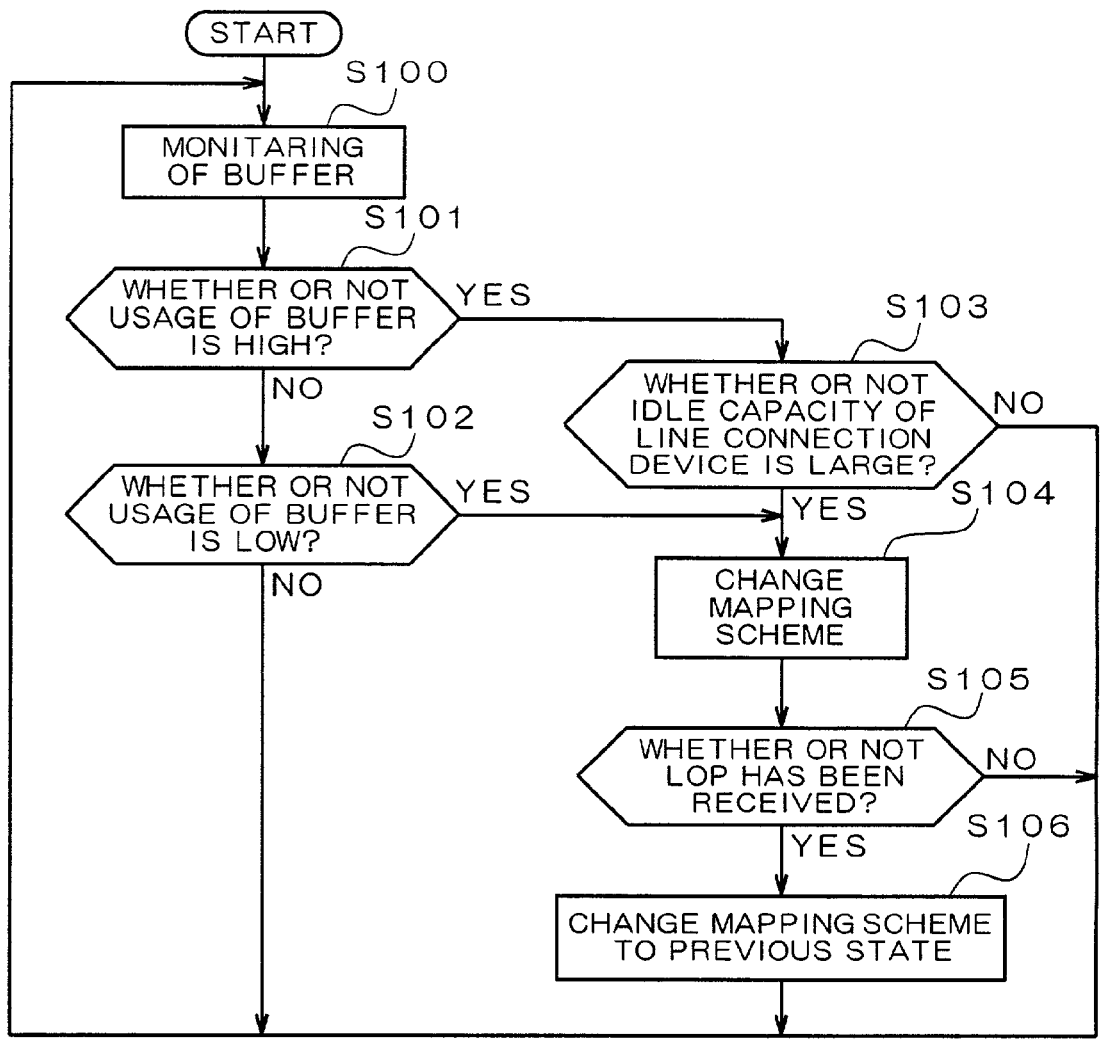
FIG. 8 is a flowchart showing an operational procedure of a sender communication apparatus.

FIG. 8 is a flowchart showing an operational procedure of the sender communication apparatus 100.

The interface device controlling section 43 in the signal monitoring device 40 is monitoring the usage of the buffer 14 in each of the LAN interface devices 10A, 10B, and 10C (step S100). Based on the monitoring result, the mapping controlling section 44 determines whether the usage of the buffer 14 is high (for example, equal to or more than 80%) or not (step S101), or whether the usage of the buffer 14 is low (for example, equal to or less than 20%) or not (step S102). If the usage is neither high nor low, negative determination is made at both steps S101 and S102, and the monitoring of the buffer 14 is repeated at step S100.

If the usage of the buffer 14 is high, positive determination is made at step S101, and the mapping controlling section 44 then determines whether the idle capacity of the line in the line connection device 30 is large or not (step S103). If the amount of use of the line currently connected by the line connection device 30 is large and not much different from the preset maximum capacity, negative determination is made at step S103. In this case, the capacity of SONET frames cannot be changed to a greater capacity. Thus, the operation returns to step S100 without change of the mapping scheme, and the monitoring of the buffer 14 is repeated. On the other hand, if the amount of use of the line currently connected by the line connection device 30 is small and widely different from the predetermined maximum capacity, positive determination is made at step S103. Then, the mapping controlling section 44 sends instructions to the LAN interface devices 10A and so on through the interface device controlling section 43 to change the mapping scheme of SONET frames (step S104). Thereafter, the LAN packet/SONET frame conversion engines 15 in the LAN interface devices 10A and so on perform conversion using SONET frames with increased capacity. For example, if STS1 SONET frames have been used before the change, STS3C SONET frames will be used thereafter. In addition, the information about the mapping scheme is included in the H1, H2, H3, and H4 bytes in POH headers, and the receiver communication apparatus 110 can know the capacity of SONET frames having the POH headers by reading the contents of these H1, H2, H3, and H4 bytes.

Then, the mapping controlling section 44 determines whether the sender communication apparatus 100 has received LOPs from the receiver communication apparatus 110 after a predetermined period or not (step S105). If the capacity of SONET frames is increased, it is not matched with the mapping scheme for SONET frames that has been used in the receiver communication apparatus 110. Therefore, the receiver communication apparatus 110 will send LOPs to the sender communication apparatus 100. However, if the receiver communication apparatus 110 then changes the capacity of SONET frames according to the mapping scheme for SONET frames received from the sender communication apparatus 100, the capacity is matched with the mapping scheme, and the transmission of LOPs has been stopped after the predetermined period. Thus, at step S105 mentioned above, the mapping controlling section 44 determines whether the mapping scheme in the receiver communication apparatus 110 has been changed or not by determining whether it receives LOPs even after the predetermined period or not. If LOPs from the receiver communication apparatus 110 has been stopped after the predetermined period, negative determination is made at step S105, and then the operation returns to step S100 mentioned above to continue the monitoring of the buffer 14. If the sender communication apparatus 100 receives LOPs from the receiver communication apparatus 110 even after the predetermined period, positive determination is made at step S105, and then the mapping controlling section 44 resets the mapping scheme to the previous mapping scheme (step S106). Then, the operation returns to step S100 mentioned above to continue the monitoring of the buffer 14.

Operation of the Receiver Communication Apparatus

Figure 9:
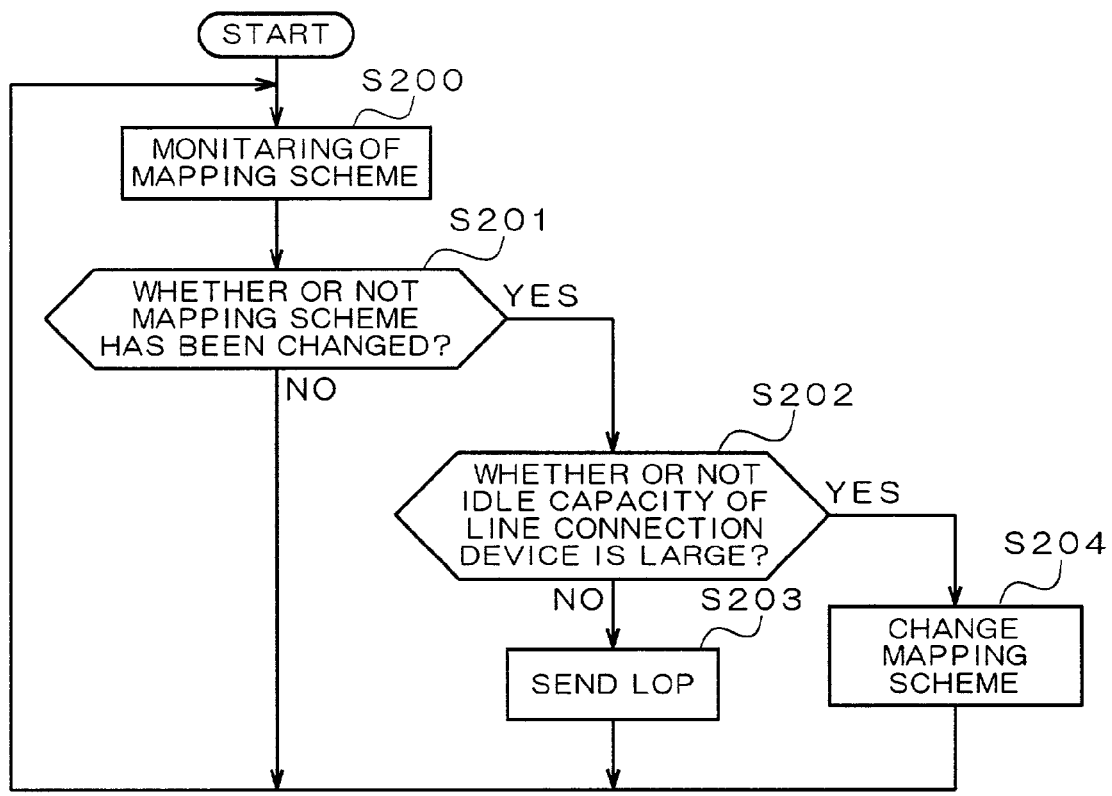
FIG. 9 is a flowchart showing an operational procedure of a receiver communication apparatus.

FIG. 9 is a flowchart showing an operational procedure of the receiver communication apparatus 110.

The SONET function processing section 42 in the signal monitoring device 40 is monitoring the mapping scheme for SONET frames sent from the sender communication apparatus 100 (step S200). Based on the monitoring result, the mapping controlling section 44 determines whether the mapping scheme for received SONET frames has been changed or not (step S201). If the capacity of SONET frames is neither increased nor decreased in the sender communication apparatus 100, the mapping scheme for received SONET frames does not change. Therefore, negative determination is made at step S201. The operation then returns to step S200 to continue the monitoring of the mapping.

If the mapping scheme for received SONET frames has been changed, positive determination is made at step S201, and then the mapping controlling section 44 determines whether the idle capacity of the line in the line connection device 30 is large or not (step S202). If the amount of use of the line currently connected by the line connection device 30 is large and not much different from the predetermined maximum capacity, negative determination is made at step S202. In this case, even though the sender communication apparatus 100 has changed the mapping scheme for SONET frames to increase the capacity, the receiver communication apparatus 110 cannot accommodate the change. Therefore, the receiver communication apparatus does not change the mapping scheme, but only sends LOPs to the sender communication apparatus 100 through the SONET function processing section 42 (step S203).

On the other hand, if the amount of use of the line currently connected by the line connection device 30 is small and widely different from the maximum capacity set beforehand, positive determination is made at step S202. Then, the mapping controlling section 44 sends instructions to the LAN interface devices 10A and so on through the interface device controlling section 43 to change the mapping of SONET frames (step S204). Because it requires a certain period for the mapping scheme to be actually changed in the receiver communication apparatus 110 after the change of the mapping scheme was detected, the SONET function processing section 42 sends LOPs to the sender communication apparatus 100 during that period.

After completion of the transmission of LOPs at step S203 or the change of the mapping scheme at step S204, the operation returns to step S200 to continue the monitoring of the mapping scheme.

Figure 10:
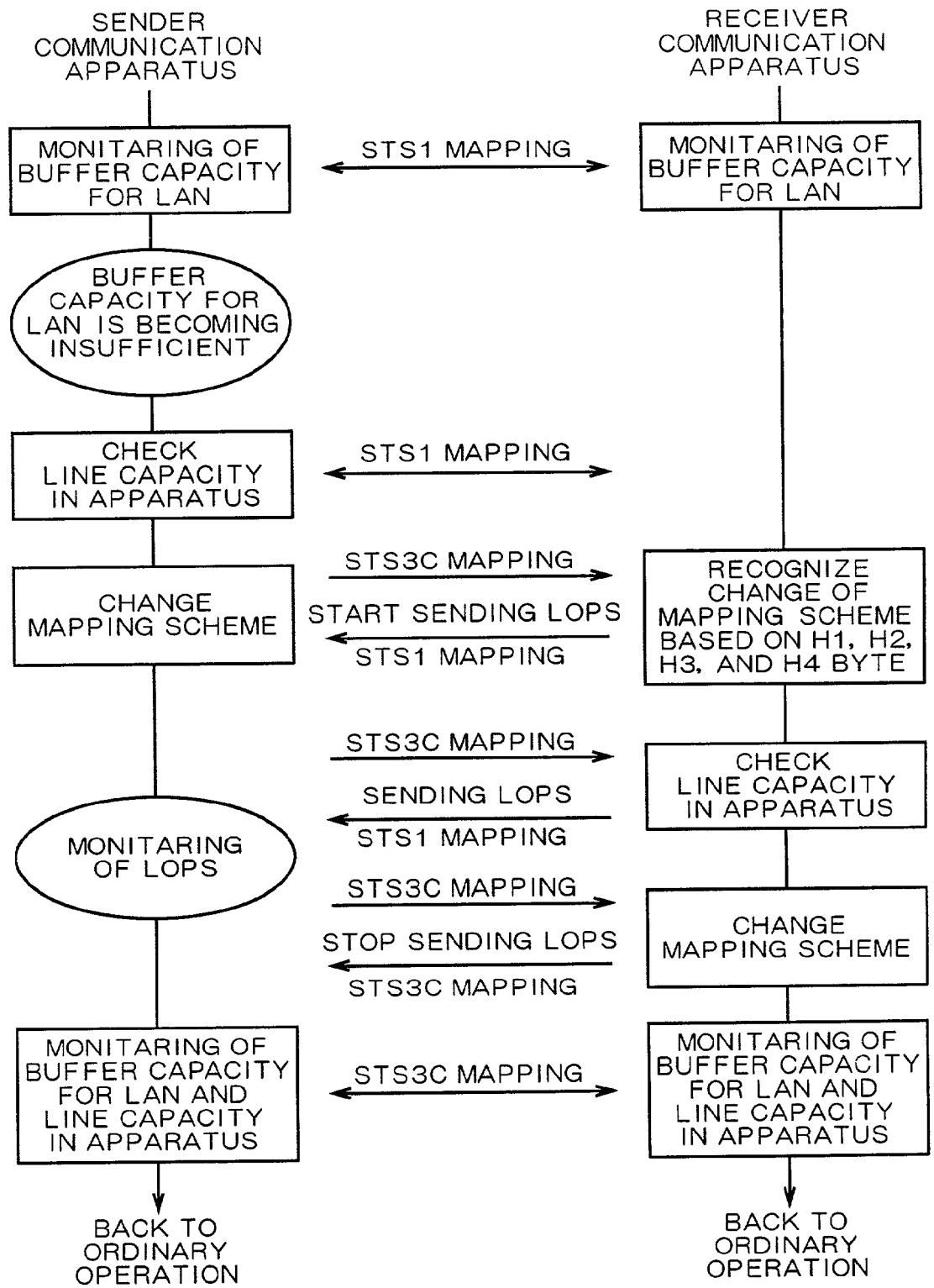
FIG. 10 is a diagram showing an operational sequence for dynamically changing mapping scheme for SONET frames sent and received between the communication apparatus.

FIG. 10 shows an operational sequence for dynamically changing the mapping scheme for SONET frames sent and received between the communication apparatus 100 and 110. For example, it shows that the mapping scheme is changed to STS3C when STS1 SONET frames are sent/received from/to between the sender communication apparatus 100 and the receiver communication apparatus 110.

The sender communication apparatus 100 is monitoring the buffer capacity for the LAN (step S100). If the buffer capacity for the LAN is becoming insufficient (step S101), the sender communication apparatus 100 checks the line capacity in the apparatus (step S103). Then, if the line capacity in the apparatus is well within the limit, the communication apparatus 100 changes the mapping scheme for SONET frames (step S104) and monitors for LOPs sent back from the receiver communication apparatus 110 (S105). If it determines that LOPs have not been sent out after a predetermined period, it starts transmission with STS3C SONET frames.

The receiver communication apparatus 110 is monitoring for change of the mapping scheme based on the H1, H2, H3, and H4 bytes included in POHs of received SONET frames (step S200). If it recognized change of the mapping scheme, it checks the line capacity in the apparatus (step S202). Then, if the line capacity in the apparatus is well within the limit, the communication apparatus 110 changes the mapping scheme for SONET frames (step S204) and starts transmission with STS3C SONET frames.

In this way, the communication apparatuses 100 and 110 in this embodiment monitor the amount of use of their buffers 14. If the amount is large, the apparatuses change the mapping to increase the capacity of SONET frames; in contrast, if the amount is small, the apparatuses change the mapping to decrease the capacity of SONET frames. Thus, SONET frames having a capacity corresponding to actual transmitted IP packets can be used, and the need to allocate SONET frames having a large capacity in advance can be eliminated. As a result, the efficiency of network use can be increased. Further, the receiver communication apparatus 110 is informed of the change of the mapping scheme by the changes in the H1 through H4 bytes included in POHs. Since the use of the H1 byte and so on is just the same as in conventional SONET frames, the communication apparatuses 100 and 110 in this embodiment that are capable of changing the dynamic mapping can coexist with conventional communication apparatus that do not support the dynamic mapping change. This is convenient for modification and extension of the network.

This invention is not limited to the above-described embodiment, but variations of the embodiment are possible within the spirit thereof. For example, although the above embodiment has been described in which the mapping scheme for SONET frames is switched between STS1 and STS3C, the mapping scheme may be also switched between STS3C and STS12C in the same manner, or virtual concatenation may be incorporated as needed. In addition, the capacity of SONET frames may be changed by two or more levels at a time as needed, rather than by one level.

Further, although the above-described embodiment is directed to transmission with frames according to the SONET/SDH standards, this invention may also be applied to transmission with frames according to other standards as long as the transmission can selectively use a plurality of line capacities.

Figure 11:
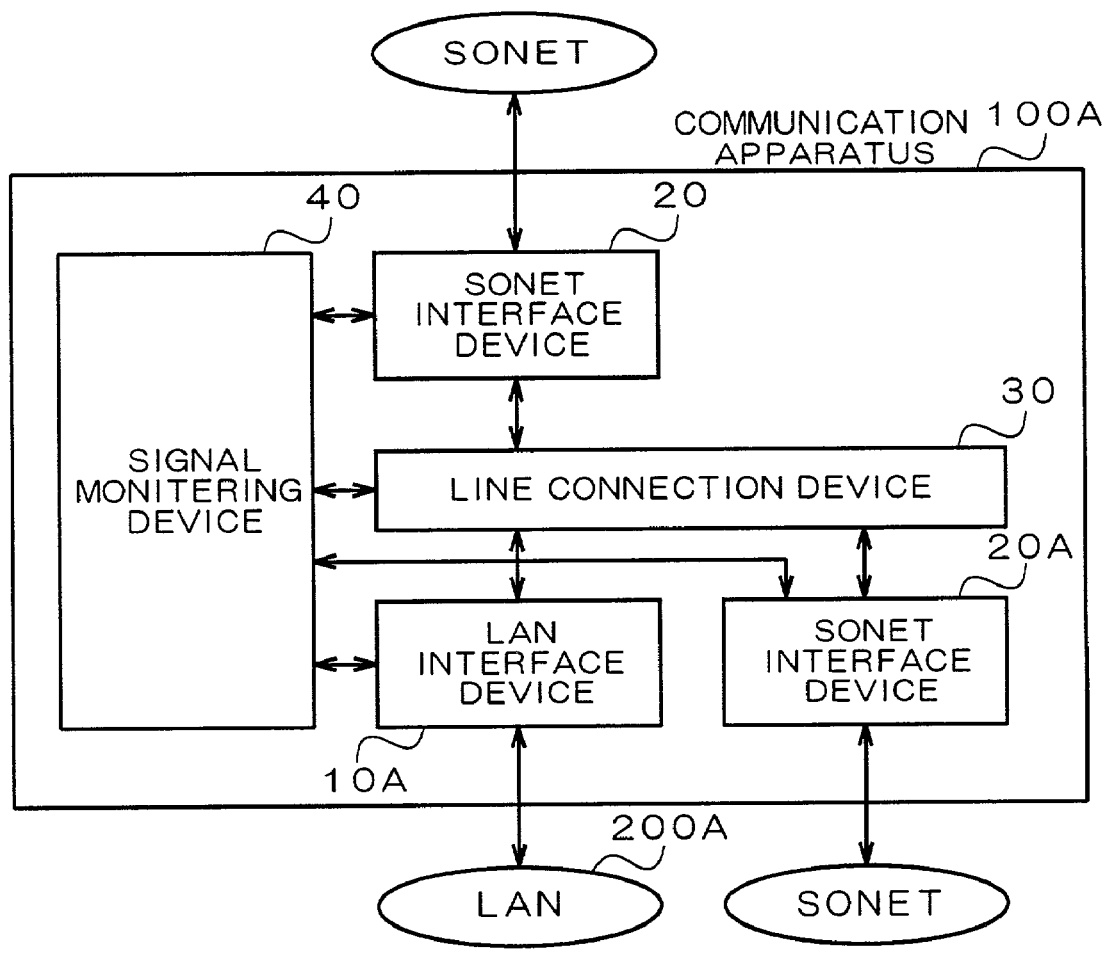
FIG. 11 is a block diagram showing a variation of the communication apparatus.
Figure 12:
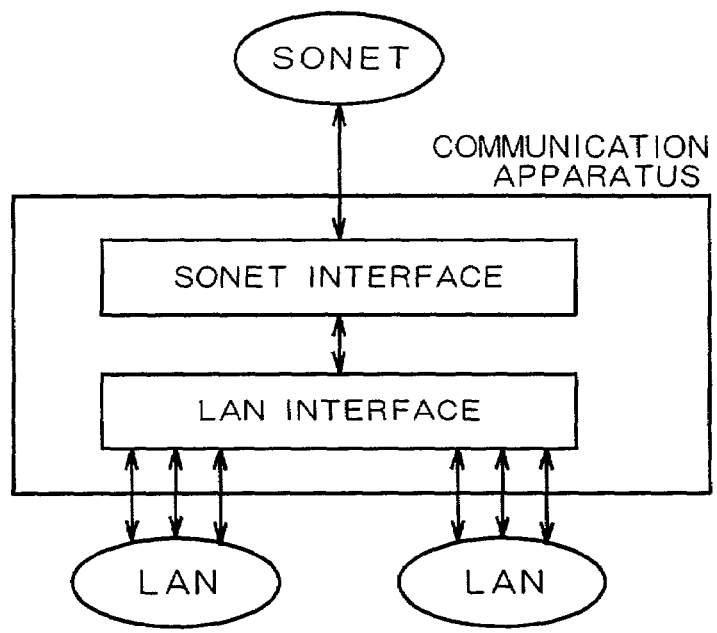
FIG. 12 is a schematic block diagram of a conventional communication apparatus for connecting IP networks and a SONET network.
Figure 13:
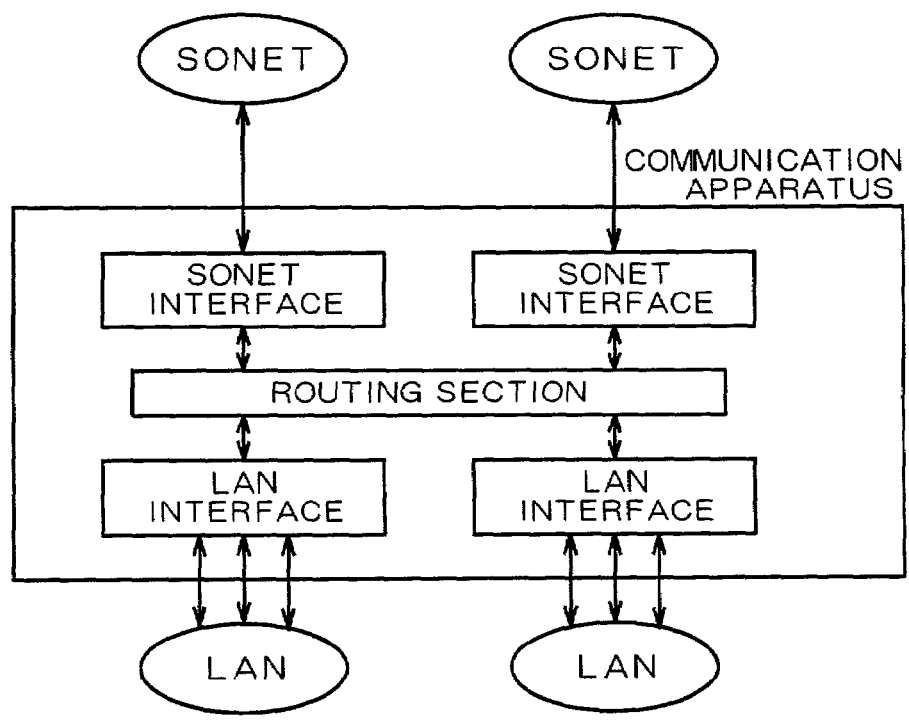
FIG. 13 is a schematic block diagram of a conventional communication apparatus for connecting IP networks and SONET networks.

Further, although the communication apparatuses 100 and 110 in the above-described embodiment include the three LAN interface devices 10A, 10B, and 10C, the SONET interface device 20, and the line connection device 30, the configuration of the communication apparatus may be in any combination of one or more of these components. For example, two SONET interface devices 20 and 20A may be used to configure the communication apparatus 100A as shown in FIG. 11.

Further, although the above embodiment has been described in which the sender communication apparatus 100 and the receiver communication apparatus 110 can dynamically change the mapping scheme, any intermediate apparatus forwarding SONET frames also needs to have an equivalent function (the function to dynamically change the mapping scheme).

In addition, although the above embodiment has been described with respect to the communication apparatuses 100 and 110 generally called routers, this invention may be applied to any communication apparatus that accepts data that are input via a certain communication path and sends the data out according to the destination. For example, this invention may be applied to various communication apparatus other than routers, such as switching equipments and L2 switches.

The invention claimed is:

1. A communication apparatus to which a LAN and a certain network are connected comprising:
   a first interface device for sending and receiving data to and from the LAN;
   a second interface device for sending and receiving data to and from the network; and
   a monitoring device which monitors operations of the first and second interface devices to set the capacity of a line connected to the network based on the amount of use of a line connected to the LAN,
   wherein, at the same time of sending and receiving data between the LAN and the network, the communication apparatus dynamically changes the capacity of the line connected to the network based on the amount of use of the line connected to the LAN, wherein the network is a SONET/SDH network, and a mapping scheme for SONET/SDH frames is dynamically set, and wherein after the capacity of the line is changed dynamically, the capacity of the line is restored when the output of loss of pointer (LOP) from receiver communication apparatus is continued to be detected even after a predetermined period elapses.

2. A communication apparatus to which a LAN and a certain network are connected comprising:

a first interface device for sending and receiving data to and from the LAN;

a second interface device for sending and receiving data to and from the network; and a monitoring device which monitors operations of the first and second interface devices to set the capacity of a line connected to the network based on the amount of use of a line connected to the LAN, wherein, at the same time of sending and receiving data between the LAN and the network, the communication apparatus dynamically changes the capacity of the line connected to the network based on the amount of use of the line connected to the LAN, wherein the network is a SONET/SDH network, and a receiver communication apparatus is informed of change of the mapping scheme by overheads of SONET/SDH frames when the mapping scheme for the SONET/SDH frames is dynamically changed, and wherein after the capacity of the line is changed dynamically, the capacity of the line is restored when the output of loss of pointer (LOP) from the receiver communication apparatus is continued to be detected even after a predetermined period elapses.

3. A method for setting the line capacity of a communication apparatus, wherein, at the same time of sending and receiving data between a LAN and a certain network, the capacity of a line connected to the network is dynamically changed based on the amount of use of a line connected to the LAN, wherein the network is a SONET/SDH network, and a mapping scheme for SONET/SDH frames is dynamically set, wherein after the capacity of the line is changed dynamically, the capacity of the line is restored when the output of loss of pointer (LOP) from receiver communication apparatus is continued to be detected even after a predetermined period elapses.

4. The method for setting the line capacity of a communication apparatus according to claim 3, wherein a receiver apparatus is informed of change of the mapping scheme by overheads of SONET/SDH frames when the mapping scheme for the SONET/SDH frames is dynamically changed, wherein after the capacity of the line is changed dynamically, the capacity of the line is restored when the output of LOPs from the receiver communication apparatus is continued to be detected even after a predetermined period elapses.

* * * * *